United States Patent
Chen (10) Patent No.: US 11,516,870 B2
(45) Date of Patent: Nov. 29, 2022

(54) DEVICE AND METHOD OF HANDLING A CELL SELECTION PROCEDURE

(71) Applicant: HTC Corporation, Taoyuan (TW)

(72) Inventor: Te-Ming Chen, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 16/188,171

(22) Filed: Nov. 12, 2018

(65) Prior Publication Data

US 2019/0150216 A1   May 16, 2019

Related U.S. Application Data (60) Provisional application No. 62/586,198, filed on Nov. 15, 2017.

(51) Int. Cl.
*H04W 76/19* (2018.01)
*H04W 48/20* (2009.01)
(Continued)

(52) U.S. Cl.
CPC ........... *H04W 76/19* (2018.02); *H04W 36/08* (2013.01); *H04W 48/20* (2013.01); *H04W 76/15* (2018.02); *H04W 76/27* (2018.02)

(58) Field of Classification Search
CPC ..... H04W 76/19; H04W 36/08; H04W 76/27; H04W 76/15; H04W 48/20
See application file for complete search history.

(56) References Cited

U.S. PATENT DOCUMENTS

| | | | |
|---|---|---|---|
| 2010/0130205 A1* | 5/2010 | Jung | H04W 36/0066 |
| | | | 455/435.2 |
| 2019/0007874 A1* | 1/2019 | Mildh | H04W 48/12 |

(Continued)

FOREIGN PATENT DOCUMENTS

| | | |
|---|---|---|
| CN | 104813635 A | 7/2015 |
| KR | 10-2018-0105249 A | 9/2018 |
| WO | WO-2017171427 A1 * | 10/2017 ............ H04W 76/27 |

OTHER PUBLICATIONS

Search Report dated Apr. 25, 2019 for EP application No. 18206284.4, pp. 1-7.

(Continued)

*Primary Examiner* — Justin T Van Roie
(74) *Attorney, Agent, or Firm* — Winston Hsu (57) ABSTRACT

A communication device for handling a cell selection procedure comprises the at least one storage device storing instructions of receiving system information from a first cell of a network, wherein the system information indicates at least one core network (CN) type supported by the first cell; performing a radio resource control (RRC) connection establishment procedure with the first cell, after receiving the system information; indicating a CN type of the at least one CN type to the network during the RRC connection establishment procedure; selecting a second cell of the network in a cell selection procedure, after performing the RRC connection establishment procedure; performing a RRC connection reestablishment procedure with the second cell, if the second cell supports the CN type; and entering an idle mode or transmitting a RRC connection request message to the network, if the second cell does not support the CN type.

16 Claims, 6 Drawing Sheets

(51) Int. Cl.
*H04W 76/15* (2018.01)
*H04W 76/27* (2018.01)
*H04W 36/08* (2009.01)

(56) References Cited

U.S. PATENT DOCUMENTS

| | | | |
|---|---|---|---|
| 2019/0110243 A1* | 4/2019 | Chun | H04W 48/16 |
| 2020/0236731 A1* | 7/2020 | Jung | H04W 68/005 |
| 2021/0120618 A1* | 4/2021 | Lee | H04W 76/27 |

OTHER PUBLICATIONS

Spreadtrum Communications, "CN Type Modification", 3GPP TSG-RAN WG2#99bis, R2-1710376, Oct. 9-13, 2017, Prague, Czech, XP051342423, pp. 1-2.

Huawei, HiSilicon, "Assistant information to perform CN selection", 3GPP TSG-RAN WG2 Meeting #99bis, R2-1711114, Oct. 9-13, 2017, Prague, Czech Republic, XP051343122, pp. 1-3.

HTC, "Discussion on CN type selection in RRC connection re-establishment", 3GPP TSG-RAN WG2 NR RAN2#100, R2-1713745, Nov. 17-Dec. 1, 2017, Reno, US, XP051372403, pp. 1-4.

Jussi Reunanen et al., "LTE Key Performance Indicator Optimization", "LTE Small Cell Optimization", 3GPP Evolution to Release 13, Dec. 14, 2015, pp. 195-248, vol. 8, 2016 John Wiley & Sons, Ltd., Chichester, UK, XP055533976.

Search Report dated Jan. 21, 2019 for EP application No. 18206284.4, pp. 1-18.

Jussi Reunanen et al., "LTE Key Performance Indicator Optimization", "LTE Small Cell Optimization", 3GPP Evolution to Release 13, Dec. 14, 2015, pp. 195-248, vol. 8, John Wiley & Sons, Ltd., Chichester, UK, XP055533976.

3GPP TS 36.331 V14.4.0, Sep. 2017.
3GPP TS 36.304 V14.4.0, Sep. 2017.
3GPP TSG-RAN2 Meeting #103, R2-1813139, Aug. 2018.
3GPP TSG RAN Meeting #75, RP-170840, Mar. 2017.
Office action dated Sep. 29, 2020 for the China application No. 201811361320.4, filing date Nov. 15, 2018, p. 1-11.

* cited by examiner

DEVICE AND METHOD OF HANDLING A CELL SELECTION PROCEDURE

CROSS REFERENCE TO RELATED APPLICATIONS

This application claims the benefit of U.S. Provisional Application No. 62/586,198, filed on Nov. 15, 2017, which is incorporated herein by reference.

BACKGROUND OF THE INVENTION

1. Field of the Invention

The present invention relates to a device and a method used in a wireless communication system, and more particularly, to a device and a method of handling a cell selection procedure.

2. Description of the Prior Art

A new radio (NR) system, developed recently in the 3rd generation partnership project (3GPP), is regarded as a NR interface and radio network architecture that provides a high data rate, a low latency, a packet optimization, and an improved system capacity and coverage.

SUMMARY OF THE INVENTION

The present invention therefore provides a communication device and method for handling a cell selection procedure to solve the abovementioned problem.

A communication device for handling a cell selection procedure comprises at least one storage device and at least one processing circuit coupled to the at least one storage device. The at least one storage device stores, and the at least one processing circuit is configured to execute instructions of receiving system information from a first cell of a network, wherein the system information indicates at least one core network (CN) type supported by the first cell; performing a radio resource control (RRC) connection establishment procedure with the first cell, after receiving the system information; indicating a CN type of the at least one CN type to the network during the RRC connection establishment procedure; selecting a second cell of the network in a cell selection procedure, after performing the RRC connection establishment procedure; performing a RRC connection reestablishment procedure with the second cell, if the second cell supports the CN type; and entering an idle mode or transmitting a RRC connection request message to the network, if the second cell does not support the CN type.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
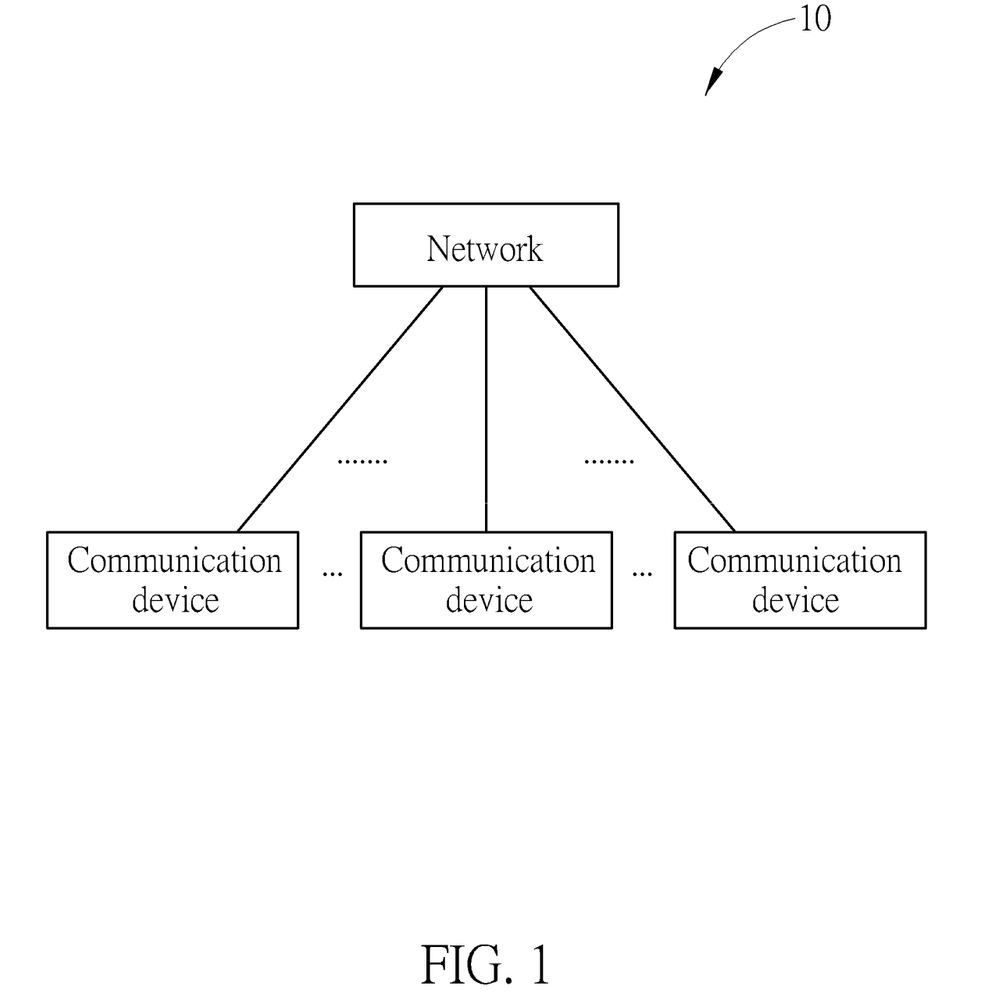
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may communicate with each other via one or multiple cells (e.g., one or multiple carriers) belonging to one or multiple base stations (BSs). The abovementioned cells may be operated in the same or different duplexing modes, i.e., frequency-division duplexing (FDD), time-division duplexing (TDD) and flexible duplexing.

In FIG. 1, the network and the communication devices are simply utilized for illustrating the structure of the wireless communication system 10. Practically, the network includes an evolved universal terrestrial radio access network (E-UTRAN) including at least one evolved Node-B (eNB) and a fifth generation (5G) network including at least one 5G BS (e.g., gNB and/or next generation eNB (ng-eNB)) which employs orthogonal frequency-division multiplexing (OFDM) and/or non-OFDM and a transmission time interval (TTI) shorter than 1 ms (e.g., 1, 2, 3 or 4 OFDM symbols, 100 or 200 microseconds), to communicate with the communication devices.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
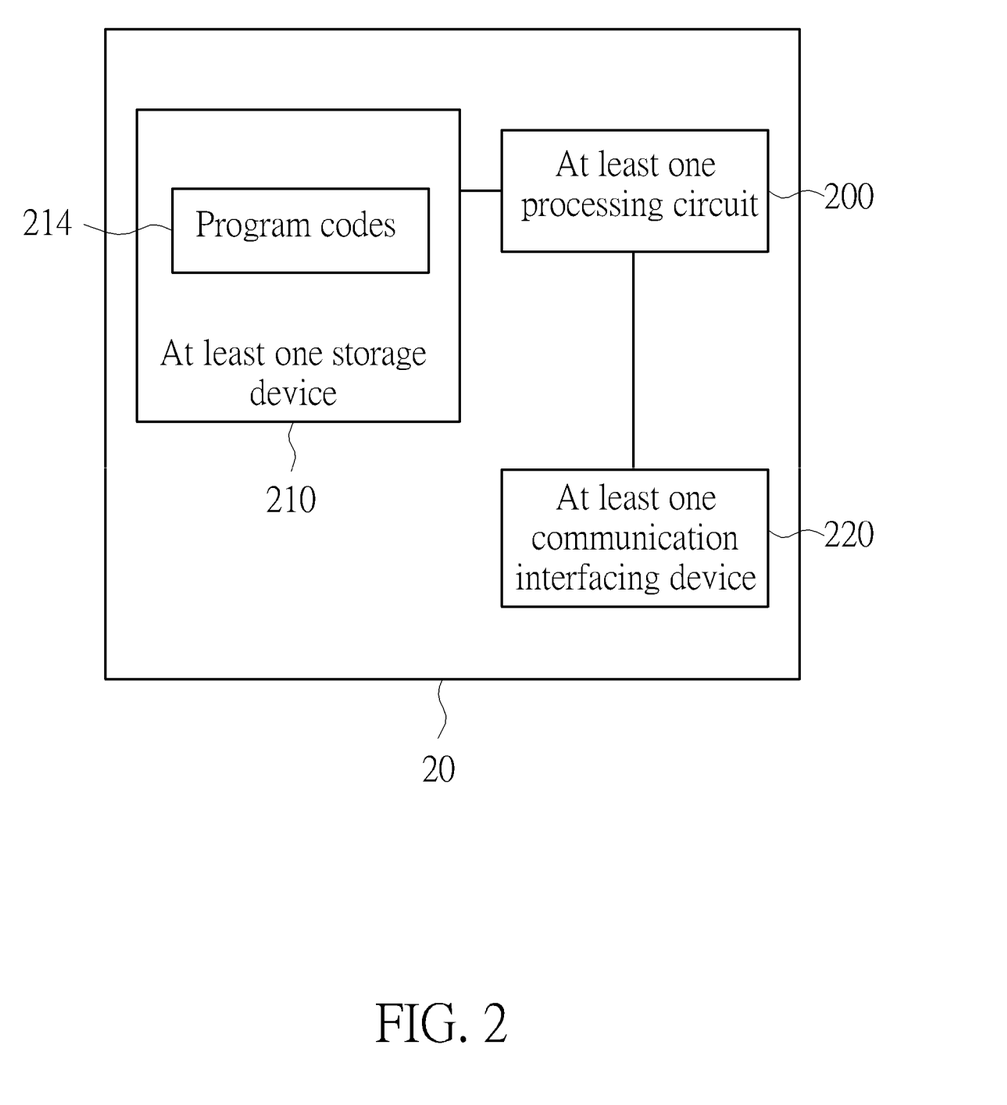
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the current system, a ng-eNB may support a fifth generation core (5GC) network and/or a Evolved Packet Core (EPC) Network. The ng-eNB broadcasts supported core network (CN) type(s) in system information. The UE may select a CN type according to the system information, and may suffer a radio link failure. Then, the UE may perform a cell selection procedure in response to the radio link failure.

In the following examples, a UE is used to represent a communication device in FIG. 1, to simplify the illustration of the embodiments.

Figure 3:
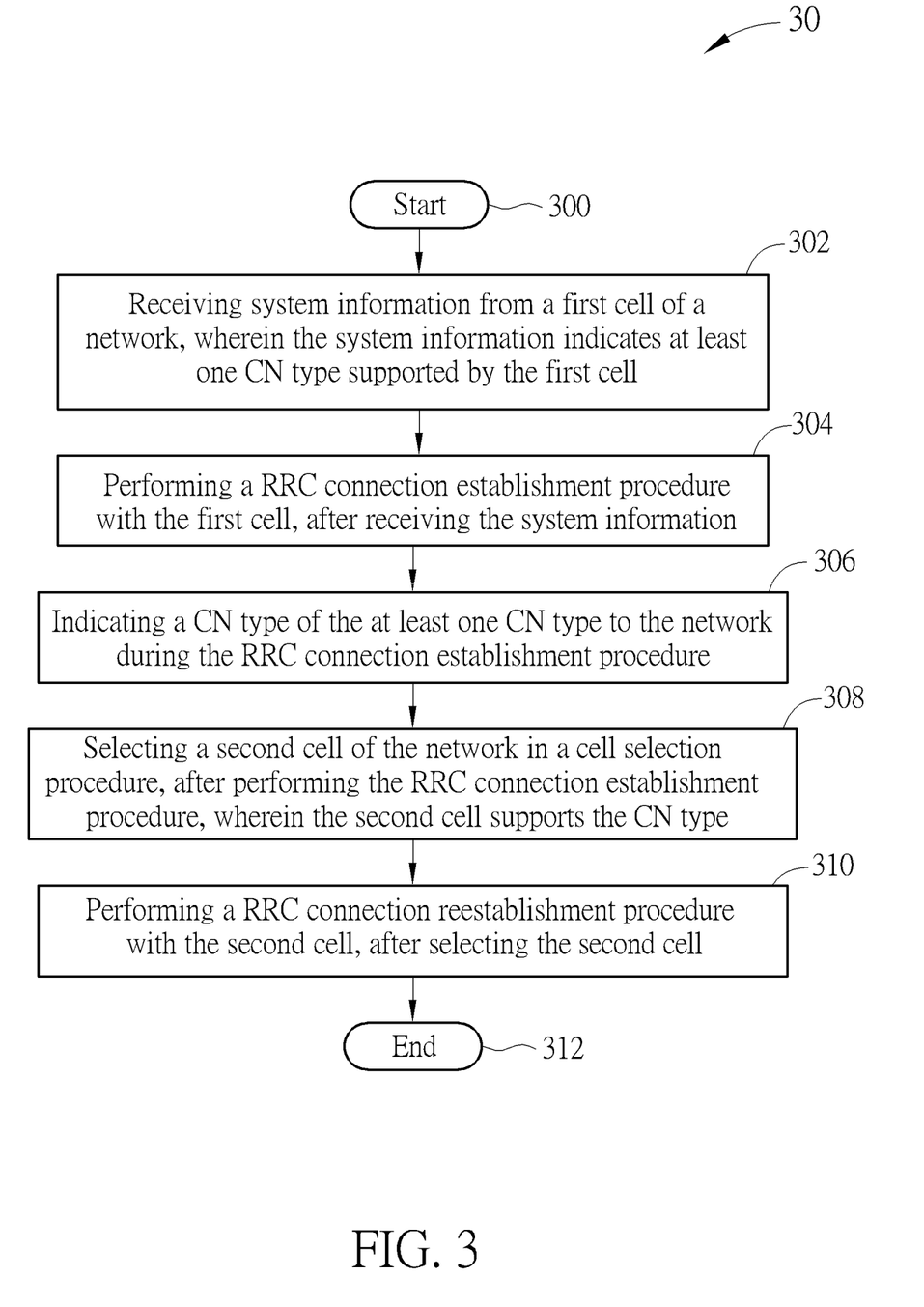
FIG. 3 is a flowchart of a process according to an example of the present invention.

A process 30 in FIG. 3 is utilized in a UE shown in FIG. 1, and includes the following steps:

Step 300: Start.

Step 302: Receiving system information from a first cell of a network, wherein the system information indicates at least one CN type supported by the first cell.

Step 304: Performing a radio resource control (RRC) connection establishment procedure with the first cell, after receiving the system information.

Step 306: Indicating a CN type of the at least one CN type to the network during the RRC connection establishment procedure.

Step 308: Selecting a second cell of the network in a cell selection procedure, after performing the RRC connection establishment procedure, wherein the second cell supports the CN type.

Step 310: Performing a RRC connection reestablishment procedure with the second cell, after selecting the second cell.

Step 312: End.

According to the process 30, the UE (e.g., in an idle mode) receives system information from a first cell of a network, wherein the system information indicates at least one CN type supported by the first cell. Then, the UE performs a RRC connection establishment procedure with the first cell after receiving the system information, indicates a CN type of the at least one CN type to the network during the RRC connection establishment procedure, and enters a connected mode after performing the RRC connection establishment procedure. Then, the UE in the connected mode detects a radio link failure, and selects a second cell of the network in a cell selection procedure, e.g., in response to the radio link failure. The UE performs a RRC connection reestablishment procedure with the second cell, wherein the second cell supports the CN type. That is, in the cell selection procedure, the UE chooses a cell which supports a CN type indicated by the UE.

In one example, the at least one CN type includes (e.g., is) at least one of an EPC and a 5GC. In one example, the CN type may be the EPC or the 5GC. The at least one CN type includes the CN type. In one example, the first cell belongs to a ng-eNB, and the second cell belongs to a eNB, a gNB or a ng-eNB. In one example, the first cell and the second cell may be the same cell or different cells.

In one example, the UE starts a timer (e.g., T311), after detecting the radio link failure. Before the timer expires, the UE selects the second cell which supports the CN type. After the timer expires, the UE selects a third cell which supports the CN type or other CN type(s).

In one example, the UE includes the CN type in a RRC message (e.g., a RRC connection request message and/or a RRC connection setup complete message), and transmits the RRC message to the network. In one example, if the CN type is the EPC, the UE does not include the CN type in the RRC message and does not transmit the CN type to the network.

In one example, the UE receives system information from at least one cell (e.g., the second cell and/or the third cell) of the network, wherein the system information indicates CN type (s) supported by the at least one cell. That is, the UE knows which CN type (s) is supported by the at least one cell according to the system information.

Figure 4:
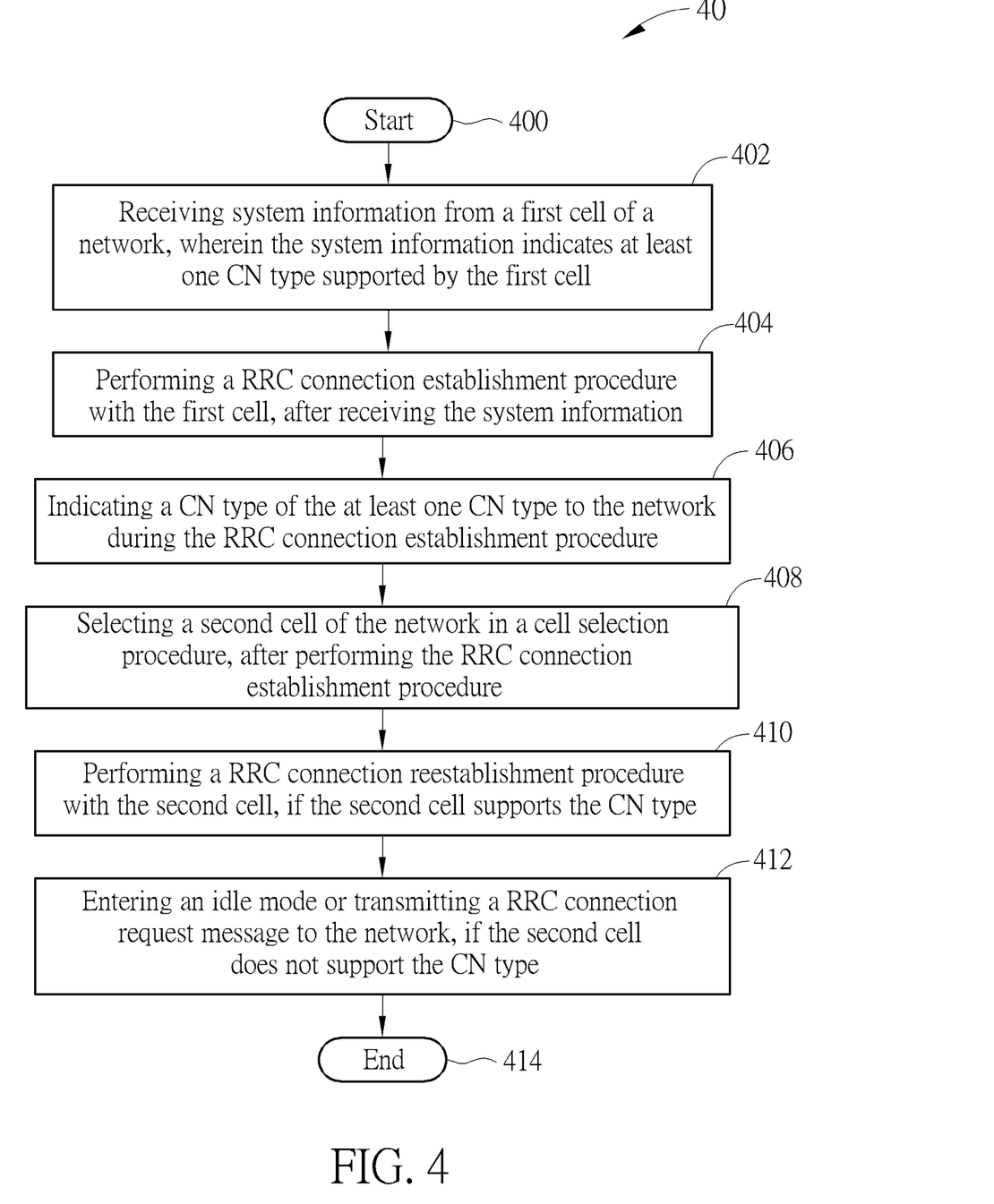
FIG. 4 is a flowchart of a process according to an example of the present invention.

A process 40 in FIG. 4 is utilized in a UE shown in FIG. 1, and includes the following steps:

Step 400: Start.

Step 402: Receiving system information from a first cell of a network, wherein the system information indicates at least one CN type supported by the first cell.

Step 404: Performing a RRC connection establishment procedure with the first cell, after receiving the system information.

Step 406: Indicating a CN type of the at least one CN type to the network during the RRC connection establishment procedure.

Step 408: Selecting a second cell of the network in a cell selection procedure, after performing the RRC connection establishment procedure.

Step 410: Performing a RRC connection reestablishment procedure with the second cell, if the second cell supports the CN type.

Step 412: Entering an idle mode or transmitting a RRC connection request message to the network, if the second cell does not support the CN type.

Step 414: End.

According to the process 40, the UE (e.g., in an idle mode) receives system information from a first cell of a network, wherein the system information indicates at least one CN type supported by the first cell. Then, the UE performs a RRC connection establishment procedure with the first cell after receiving the system information, and indicates a CN type of the at least one CN type to the network during the RRC connection establishment procedure, and enters a connected mode after performing the RRC connection establishment procedure. Then, the UE in the connected mode detects a radio link failure and selects a second cell of the network in a cell selection procedure, e.g., in response to the radio link failure. If the second cell supports the CN type, the UE performs a RRC connection reestablishment procedure with the second cell. If the second cell does not support the CN type, the UE enters the idle mode or transmits a RRC connection request message to the network. That is, the behavior of the UE is determined according to whether a cell selected in the cell selection procedure supports a CN type indicated by the UE.

In one example, the at least one CN type includes (e.g., is) at least one of an EPC and a 5GC. In one example, the CN type may be the EPC or the 5GC. The at least one CN type includes the CN type. In one example, the first cell and the second cell belong to ng-eNBs. In one example, the first cell and the second cell may be the same cell or different cells. In one example, the second cell broadcasts CN type(s) supported by the second cell. That is, the UE may receive system information indicating the CN type(s) from the second cell, and may perform the cell selection procedure according to the system information.

For example, the first cell is the ng-eNB supporting the EPC and the 5GC or the ng-eNB only supporting the 5GC, and the UE indicates the 5GC (i.e., the CN type) to the network. If the second cell selected by the UE is the ng-eNB supporting the EPC and the 5GC or the ng-eNB only supporting the 5GC, i.e., the second cell supports the CN type, the UE performs the RRC connection reestablishment procedure. If the second cell is the ng-eNB only supporting the EPC, i.e., the second cell does not support the CN type, the UE enters the idle mode or transmits the RRC connection request message.

For example, the first cell is the ng-eNB supporting the EPC and the 5GC or the ng-eNB only supporting the EPC, and the UE indicates the EPC (i.e., the CN type) to the network. If the second cell selected by the UE is the ng-eNB supporting the EPC and the 5GC or the ng-eNB only supporting the EPC, i.e., the second cell supports the CN type, the UE performs the RRC connection reestablishment procedure. If the second cell is the ng-eNB only supporting the 5GC, i.e., the second cell does not support the CN type, the UE enters the idle mode or transmits the RRC connection request message.

In one example, the UE informs at least one of a new CN type and a CN type change to an upper layer, after selecting the second cell which does not support the CN type. In one example, the UE informs the at least one of the new CN type and the CN type change to the upper layer, after transmitting the RRC connection request message to the network.

The examples of the process 30 may be applied to the process 40, and are not narrated herein.

Figure 5:
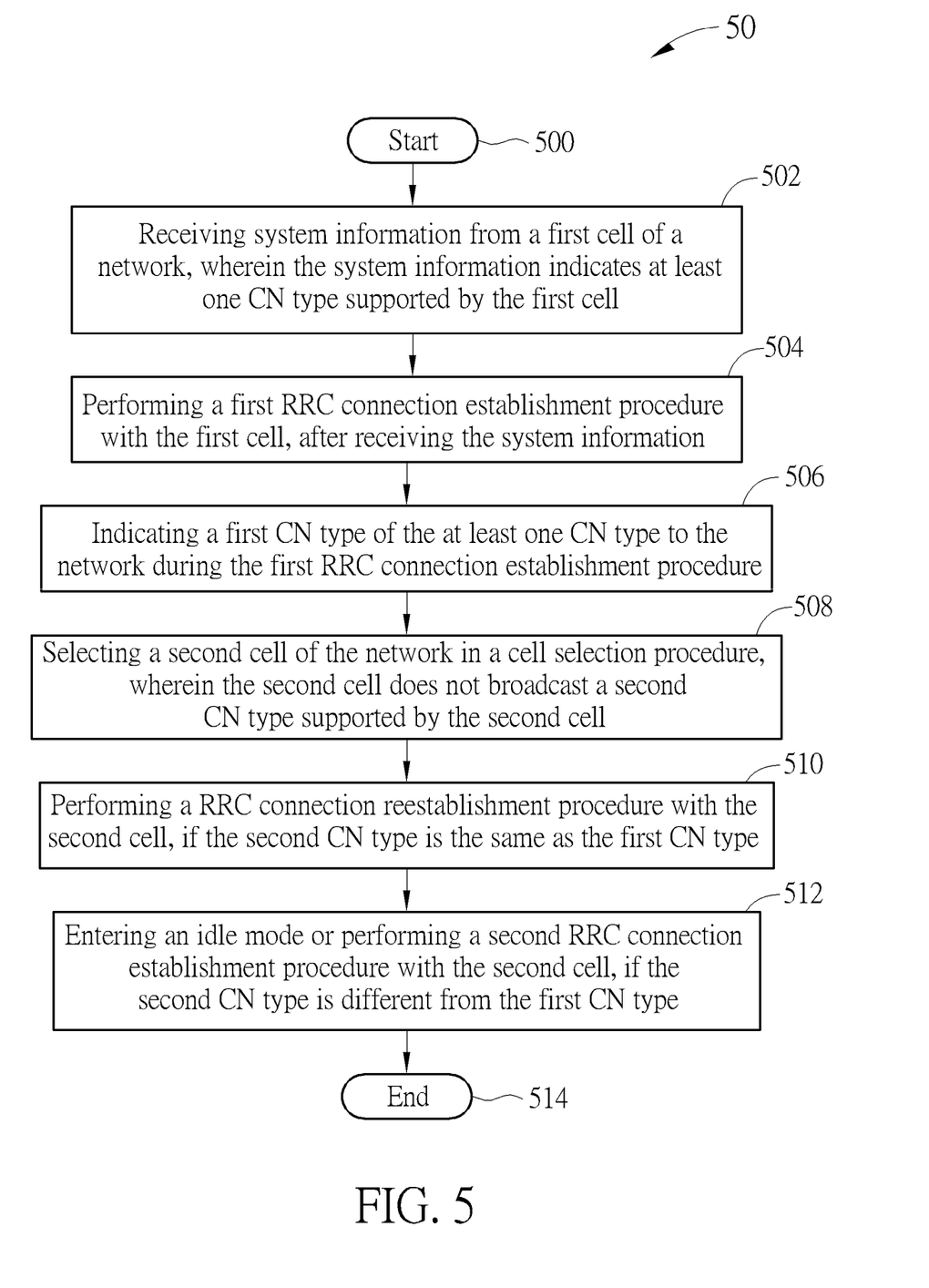
FIG. 5 is a flowchart of a process according to an example of the present invention.

A process 50 in FIG. 5 is utilized in a UE shown in FIG. 1, and includes the following steps:

Step 500: Start.

Step 502: Receiving system information from a first cell of a network, wherein the system information indicates at least one CN type supported by the first cell.

Step 504: Performing a first RRC connection establishment procedure with the first cell, after receiving the system information.

Step 506: Indicating a first CN type of the at least one CN type to the network during the first RRC connection establishment procedure.

Step 508: Selecting a second cell of the network in a cell selection procedure, wherein the second cell does not broadcast a second CN type supported by the second cell.

Step 510: Performing a RRC connection reestablishment procedure with the second cell, if the second CN type is the same as the first CN type.

Step 512: Entering an idle mode or performing a second RRC connection establishment procedure with the second cell, if the second CN type is different from the first CN type.

Step 514: End.

According to the process 50, the UE (e.g., in an idle mode) receives system information from a first cell of a network, wherein the system information indicates at least one CN type supported by the first cell. Then, the UE performs a first RRC connection establishment procedure with the first cell after receiving the system information, indicates a first CN type of the at least one CN type to the network during the RRC connection establishment procedure, and enters a connected mode after performing the RRC connection establishment procedure. The UE in the connected mode detects a radio link failure, and selects a second cell of the network in a cell selection procedure, e.g., in response to the radio link failure, wherein the second cell does not broadcast a second CN type supported by the second cell. If the second CN type is the same as the first CN type, the UE performs a RRC connection reestablishment procedure with the second cell. If the second CN type is different from the first CN type, the UE enters the idle mode or performs a second RRC connection establishment procedure. That is, the behavior of the UE is determined according to the first CN type and the second CN type.

In one example, the at least one CN type includes (e.g., is) at least one of an EPC and a SGC. In one example, the first CN type may be the EPC or the SGC, and the second CN type may be an EPC or a SGC. The at least one CN type includes the first CN type. In one example, the first cell belongs to a ng-eNB, and the second cell belongs to an eNB or a gNB. That is, the first cell and the second cell are different cells.

For example, the first cell is the ng-eNB supporting the EPC and the 5GC or the ng-eNB only supporting the EPC, and the UE indicates the EPC (i.e., the first CN type) to the network. If the second cell selected by the UE is the eNB supporting the EPC (i.e., the second CN type), i.e., the second CN type is the same as the first CN type, the UE performs the RRC connection reestablishment procedure with the second cell. If the second cell is the gNB supporting the 5GC (i.e., the second CN type), i.e., the second CN type is different from the first CN type, the UE enters the idle mode or performs the second RRC connection establishment procedure.

For example, the first cell is the ng-eNB supporting the EPC and the 5GC or the ng-eNB only supporting the 5GC, and the UE indicates the 5GC (i.e., the first CN type) to the network. If the second cell is the gNB supporting the 5GC (i.e., the second CN type), i.e., the second CN type is the same as the first CN type, the UE performs the RRC connection reestablishment procedure with the second cell. If the second cell is the eNB supporting the EPC (i.e., the second CN type), i.e., the second CN type is different from the first CN type, the UE enters the idle mode or performs the second RRC connection establishment procedure.

In one example, the UE informs at least one of that the second cell does not broadcast the second CN type, the second cell belongs to the eNB or the gNB and the second cell is different from the first cell to an upper layer, after performing the RRC connection reestablishment procedure or the second RRC connection establishment procedure. In one example, the UE informs the at least one of that the second cell does not broadcast the second CN type, the second cell belongs to the eNB or the gNB and the second cell is different from the first cell to the upper layer, after selecting the second cell.

The examples of the processes 30 and 40 may be applied to the process 50, and are not narrated herein.

Figure 6:
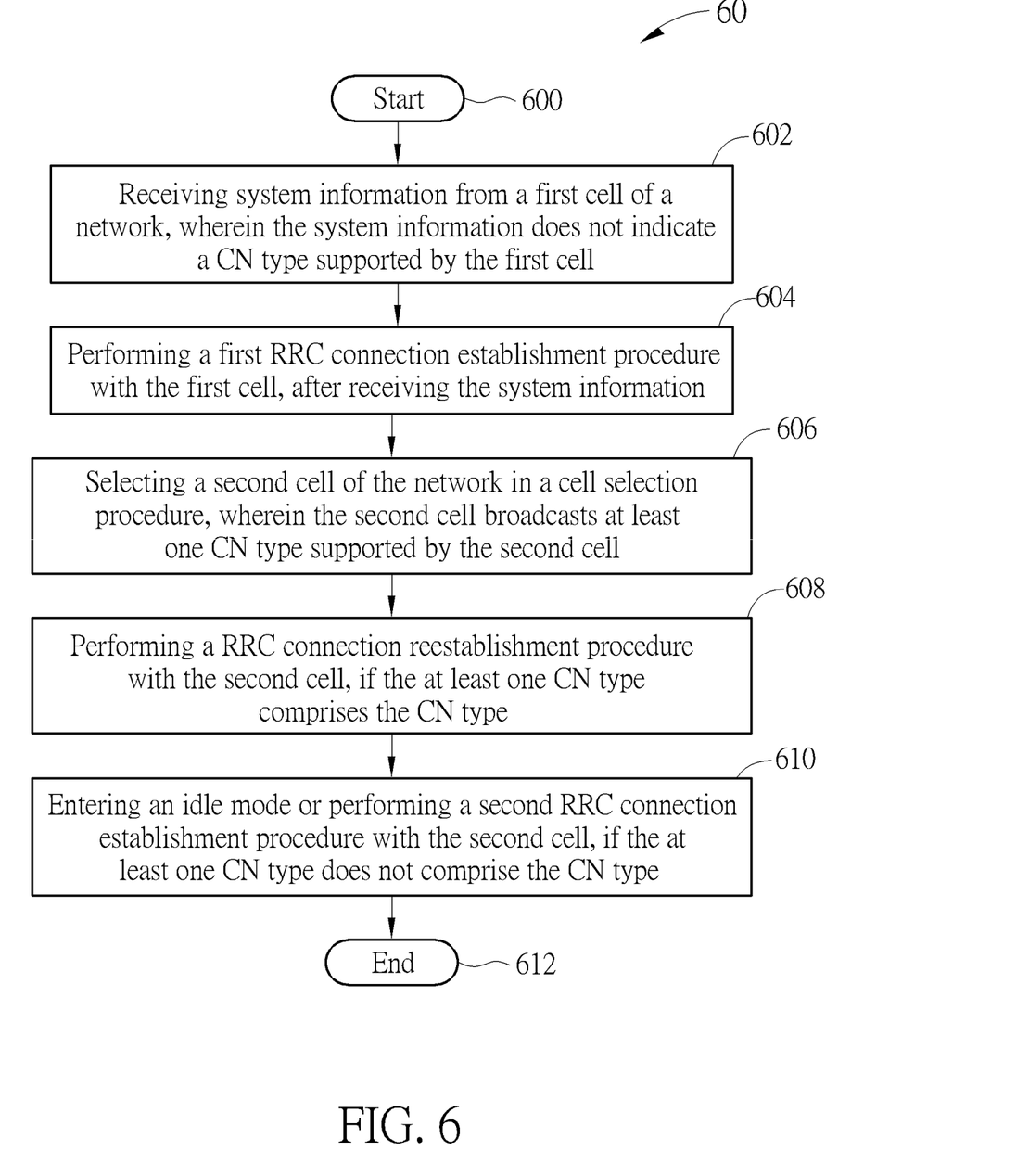
FIG. 6 is a flowchart of a process according to an example of the present invention.

A process 60 in FIG. 6 is utilized in a UE shown in FIG. 1, and includes the following steps:

Step 600: Start.

Step 602: Receiving system information from a first cell of a network, wherein the system information does not indicate a CN type supported by the first cell.

Step 604: Performing a first RRC connection establishment procedure with the first cell, after receiving the system information.

Step 606: Selecting a second cell of the network in a cell selection procedure, wherein the second cell broadcasts at least one CN type supported by the second cell.

Step 608: Performing a RRC connection reestablishment procedure with the second cell, if the at least one CN type comprises the CN type.

Step 610: Entering an idle mode or performing a second RRC connection establishment procedure with the second cell, if the at least one CN type does not comprise the CN type.

Step 612: End.

According to the process 60, the UE (e.g., in an idle mode) receives system information from a first cell of a network, wherein the system information does not indicate a CN type supported by the first cell. Then, the UE performs a first RRC connection establishment procedure with the first cell after receiving the system information, and enters a connected mode. The UE in the connected mode detects a radio link failure, and selects a second cell of the network in a cell selection procedure, e.g., in response to the radio link failure, wherein the second cell broadcasts at least one CN type supported by the second cell. If the at least one CN type comprises the CN type, the UE performs a RRC connection reestablishment procedure with the second cell. If the at least one CN type does not comprise the CN type, the UE enters the idle mode or performs a second RRC connection establishment procedure with the second cell. That is, the behavior of the UE is determined according to whether the at least one CN type comprises the CN type.

In one example, the CN type may be the EPC or the 5GC. In one example, the at least one CN type may include (e.g., may be) at least one of an EPC and a 5GC. In one example, the first cell belongs to an eNB or a gNB, and the second cell belongs to a ng-eNB. That is, the first cell and the second cell are different cells.

For example, the first cell is the eNB supporting the EPC (i.e., the CN type), and the second cell selected by the UE is the ng-eNB supporting the EPC and the 5GC (i.e., the at least one CN type) or the ng-eNB only supporting the EPC (i.e., the at least one CN type). In this situation, the at least one CN type includes the CN type, and the UE performs the RRC connection reestablishment procedure. For example, the first cell is the eNB supporting the EPC (i.e., the CN type), and the second cell is the ng-eNB only supporting the 5GC (i.e., the at least one CN type). In this situation, the at least one CN type does not include the CN type, and the UE enters the idle mode or performs the RRC connection reestablishment procedure.

For example, the first cell is the gNB supporting the 5GC (i.e., the CN type), and the second cell is the ng-eNB supporting the EPC and the 5GC (i.e., the at least one CN type) or the ng-eNB only supporting the 5GC (i.e., the at least one CN type). In this situation, the at least one CN type includes the CN type, and the UE performs the RRC connection reestablishment procedure. For example, the first cell is the gNB supporting the 5GC (i.e., the CN type), and the second cell is the ng-eNB only supporting the EPC (i.e., the at least one CN type). In this situation, the at least one CN type does not include the CN type, and the UE enters the idle mode or performs the RRC connection reestablishment procedure.

In one example, the UE informs at least one of that the second cell belongs to the ng-eNB and the second cell is different from the first cell to an upper layer, after performing the RRC connection reestablishment procedure or the second RRC connection establishment procedure. In one example, the UE informs the at least one of that the second cell belongs to the ng-eNB and the second cell is different from the first cell to the upper layer, after selecting the second cell.

The examples of the processes 30~50 may be applied to the process 60, and are not narrated herein.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling a cell selection procedure. After a cell selection procedure, the behavior of a UE is determined according to CN types of cell (s) selected by the UE. Thus, the problem of handling the cell selection procedure can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a cell selection procedure, comprising:
   at least one storage device; and
   at least one processing circuit, coupled to the at least one storage device, wherein the at least one storage device stores, and the at least one processing circuit is configured to execute instructions of:
   receiving system information from a first cell of a network, wherein the system information indicates at least one core network (CN) type supported by the first cell;
   performing a radio resource control (RRC) connection establishment procedure with the first cell, after receiving the system information;
   indicating a CN type of the at least one CN type to the network during the RRC connection establishment procedure;
   selecting a second cell of the network in a cell selection procedure, after performing the RRC connection establishment procedure;
   performing a RRC connection reestablishment procedure with the second cell, if the second cell supports the CN type; and
   entering an idle mode from a connected mode, if the second cell does not support the CN type.

2. The communication device of claim 1, wherein the CN type is an Evolved Packet Core Network (EPC) or a fifth generation core network (5GC).

3. The communication device of claim 1, wherein the first cell and the second cell belong to next generation evolved Node-Bs (ng-eNBs).

4. The communication device of claim 1, wherein the first cell is different from the second cell.

5. The communication device of claim 1, wherein the storage device further stores the instruction of:
   informing at least one of a new CN type and a CN type change to an upper layer, after selecting the second cell which does not support the CN type.

6. The communication device of claim 1, wherein the storage device further stores the instruction of:
   informing at least one of a new CN type and a CN type change to an upper layer, after transmitting a RRC connection request message to the network.

7. A communication device for handling a cell selection procedure, comprising:
   at least one storage device; and
   at least one processing circuit, coupled to the at least one storage device, wherein the at least one storage device stores, and the at least one processing circuit is configured to execute instructions of:

receiving system information from a first cell of a network, wherein the system information indicates at least one core network (CN) type supported by the first cell;
performing a first radio resource control (RRC) connection establishment procedure with the first cell, after receiving the system information;
indicating a first CN type of the at least one CN type to the network during the first RRC connection establishment procedure;
selecting a second cell of the network in a cell selection procedure, wherein the second cell does not broadcast a second CN type supported by the second cell;
performing a RRC connection reestablishment procedure with the second cell, if the second CN type is the same as the first CN type; and
entering an idle mode from a connected mode, if the second CN type is different from the first CN type.

8. The communication device of claim 7, wherein the first cell belongs to a next generation evolved Node-B (ng-eNB), and the second cell belongs to an eNB or a 5G Node-B (gNB).

9. The communication device of claim 7, wherein the first CN type is an Evolved Packet Core Network (EPC) or a fifth generation core network (5GC), and the second CN type is an EPC or a 5GC.

10. The communication device of claim 7, wherein the storage device further stores the instruction of:
informing at least one of that the second cell does not broadcast the second CN type, the second cell belongs to an eNB or a gNB and the second cell is different from the first cell to an upper layer, after performing the RRC connection reestablishment procedure.

11. The communication device of claim 7, wherein the storage device further stores the instruction of:
informing at least one of that the second cell does not broadcast the second CN type, the second cell belongs to an eNB or a gNB and the second cell is different from the first cell to an upper layer, after selecting the second cell.

12. A communication device for handling a cell selection procedure, comprising:
at least one storage device; and
at least one processing circuit, coupled to the at least one storage device, wherein the at least one storage device stores, and the at least one processing circuit is configured to execute instructions of:
receiving system information from a first cell of a network, wherein the system information does not indicate a core network (CN) type supported by the first cell;
performing a first radio resource control (RRC) connection establishment procedure with the first cell, after receiving the system information;
selecting a second cell of the network in a cell selection procedure, wherein the second cell broadcasts at least one CN type supported by the second cell;
performing a RRC connection reestablishment procedure with the second cell, if the at least one CN type comprises the CN type; and
entering an idle mode from a connected mode, if the at least one CN type does not comprise the CN type.

13. The communication device of claim 12, wherein the first cell belongs to an evolved Node-B (eNB) or a 5G Node-B (gNB), and the second cell belongs to a next generation eNB (ng-eNB).

14. The communication device of claim 12, wherein the CN type is an Evolved Packet Core Network (EPC) or a fifth generation core network (5GC), and the at least one CN type is at least one of an EPC or a 5GC.

15. The communication device of claim 12, wherein the storage device further stores the instruction of:
informing at least one of that the second cell belongs to a ng-eNB and the second cell is different from the first cell to an upper layer, after performing the RRC connection reestablishment procedure.

16. The communication device of claim 12, wherein the storage device further stores the instruction of:
informing at least one of that the second cell belongs to a ng-eNB and the second cell is different from the first cell to an upper layer, after selecting the second cell.

* * * * *